United States Patent [19]

Watanuki et al.

[11] Patent Number: 5,062,312

[45] Date of Patent: Nov. 5, 1991

[54] ACTUATOR

[75] Inventors: Yoshio Watanuki; Haruo Mochida; Masaru Inoue; Kazuya Suzuki; Masaki Tanaka, all of Yokohama, Japan

[73] Assignees: Nissan Motor Co., Ltd.; Jidosha Denki Kogyo K.K., both of Kanagawa, Japan

[21] Appl. No.: 450,102

[22] Filed: Dec. 13, 1989

[30] Foreign Application Priority Data

Dec. 15, 1988 [JP] Japan .................. 63-162568[U]

[51] Int. Cl.⁵ .................. F16H 29/20; F16D 71/00
[52] U.S. Cl. .................. 74/89.14; 192/142 R
[58] Field of Search .................. 74/89.14, 425; 192/142 R; 200/501

[56] References Cited

U.S. PATENT DOCUMENTS

| | | | |
|---|---|---|---|
| 1,339,845 | 5/1920 | Burchett | 200/501 X |
| 1,387,636 | 8/1921 | Alden | 74/425 |
| 2,464,584 | 12/1947 | Kesselring | 74/425 |
| 2,844,038 | 7/1958 | Danta | 74/425 X |
| 3,406,583 | 10/1968 | Baier | 74/425 X |
| 3,635,100 | 1/1972 | Littmann | 74/425 X |
| 4,806,712 | 2/1989 | Hoffman et al. | 200/501 X |

FOREIGN PATENT DOCUMENTS

| | | | |
|---|---|---|---|
| 810950 | 8/1951 | Fed. Rep. of Germany | 74/425 |
| 60-59278 | 5/1985 | Japan . | |
| 967093 | 8/1964 | United Kingdom | 74/425 |

Primary Examiner—Leslie A. Braun
Assistant Examiner—Julie Krolikowski
Attorney, Agent, or Firm—Sughrue, Mion, Zinn, Macpeak & Seas

[57] ABSTRACT

An actuator is provided with a motor having a worm, a worm wheel in engagement with said worm and having a pinion-engaging part, a pinion having a worm wheel-engaging part and a rotational axis offset from the rotational axis of the worm wheel, a sector wheel having an output arm and meshing with the pinion, a contact holder, and a positional switch for switching contacts according to the engagement of the contact holder with the sector wheel. The sector wheel is sited at its starting position in a state in which the pinion-engaging part is engaged with the worm wheel-engaging part at a position opposite to the rotational axis of the pinion relative to the rotational axis of the worm wheel. The actuator is compact and uses the motor power very effectively.

1 Claim, 7 Drawing Sheets

ACTUATOR

BACKGROUND OF THE INVENTION

1. Field of The Invention

This invention relates to an actuator used, for example, for a door locking system which may lock or unlock a door automatically.

2. Description Of The Prior Art

Heretofore, there has been used an actuator as shown in FIG. 8 (see Japanese Patent Disclosure No. 60-59278/85).

An actuator 100 shown in the figure is fitted with a motor 102 in a motor fitting part 101a provided to a casing 101. The motor 102 is installed in the casing 101 so as to align the logitudinal direction of the motor 102 with the direction of the thickness of the casing 101 by pressing a bar 103 onto an end cover 102 of the motor 102 and driving screw 104 through the bar 103 into the casing 101.

A pinion 105 is force-fitted onto the shaft 102b protruding from the end cover 102a along the longitudinal direction of said motor 102, and is meshed with a larger gear part 106a of an intermediate gear 106 which has the larger gear part 106a and a smaller gear part 106b as one body and is supported rotatably by an intermediate shaft 107.

A sector wheel 109 is fixed to an output shaft 108 supported rotatably by the casing 101, and is so designed as to rotate oscillatively within a range restricted by dampers 101b and 101c provided to the casing 101. The smaller gear part 106b of the intermediate gear 106 is meshed with said sector wheel 109.

Additionally, a swing arm 110 is fixed to the output shaft 108 on the outside of the casing 101 in order to transmit the output to the outside.

Upon supplying a prescribed electric current to the motor 102 through a terminal 102c or 102d, the shaft 102b of the motor 102 rotates in the forward or reverse direction.

By the rotation of the shaft 102b of the motor 102 in forward direction, the power of the shaft 102b is transmitted to the sector wheel 109 from the pinion 105 through the larger gear part 106a and the smaller gear part 106b of the intermediate gear 106, and the sector wheel 109 engages the damper 101b provided to the casing 101. The sector wheel 109 engages another damper 101c when the shaft 102b of the motor 102 rotates in the reverse direction, said sector wheel 109 rotates oscillatively in the range in which the sector wheel 109 is out of contact with either damper 101b or 101c.

Thereby the swing arm 110 functions, a door (not shown) is locked and unlocked by getting a door lock rod 111 up and down which is connected with said swing arm 110.

However, in the conventional actuator 100 as mentioned above, because the motor 102 is fitted into the motor fitting part 101a provided to the casing 101 in a state in which the longitudinal axis of the motor 102 and the thickness of the casing 101 are the same, it is difficult to make the depth of the casing 101 small which is equivalent to the length of the shaft 102b of the motor 102. Therefore, there is a problem in that it is impossible to make the actuator 100 as desired.

SUMMARY OF THE INVENTION

This invention is made in view of the above mentioned problem of the prior art as a result of particular considerations of the structure with the object of providing a compact acuator.

The construction of the actuator according to this invention for accomplishing the above-mentioned object is characterized by comprising a motor, a worm provided on a shaft of said motor, a worm wheel meshing with said worm and provided with a pinion-engaging part biased to return to its original position, a pinion provided with a worm wheel-engaging part to be engaged with said pinion-engaging part and having a rotational axis in a position different from the position of a rotational axis of said worm wheel, a sector wheel meshing with said pinion and provided with an output arm and a holder-engaging slot, a contact holder coupled to said sector wheel through said holder-engaging slot, and a changeover means for switching a contact on and off according to the linkage of said contact holder with said sector wheel; said sector wheel being positioned in its starting position with the pinion engaging part engaged with the worm wheel engaging part at a position opposite to the rotational axis of the pinion with respect to the rotational axis of the worm wheel.

In the actuator according to this invention, the worm provided on the shaft of the motor is meshed with the worm wheel provided with the pinion-engaging part and biased in the direction to return to its original position, the pinion which is provided with the worm wheel-engaging part receiving the power of the worm wheel by engaging with said pinion-engaging part and has a rotational axis in a position different from the position of the rotational axis of the worm wheel is meshed with the sector wheel provided with output arm and the sector wheel is located at its starting position with the pinion engaging part engaged with the wheel engaging part at a position opposite to the rotational axis of the pinion with respect to the rotational axis of the worm wheel. Therefore, said actuator is compact and so designed as to enable the motor power to be used effectively.

DESCRIPTION OF THE PREFERRED EMBODIMENT

Figure 1:
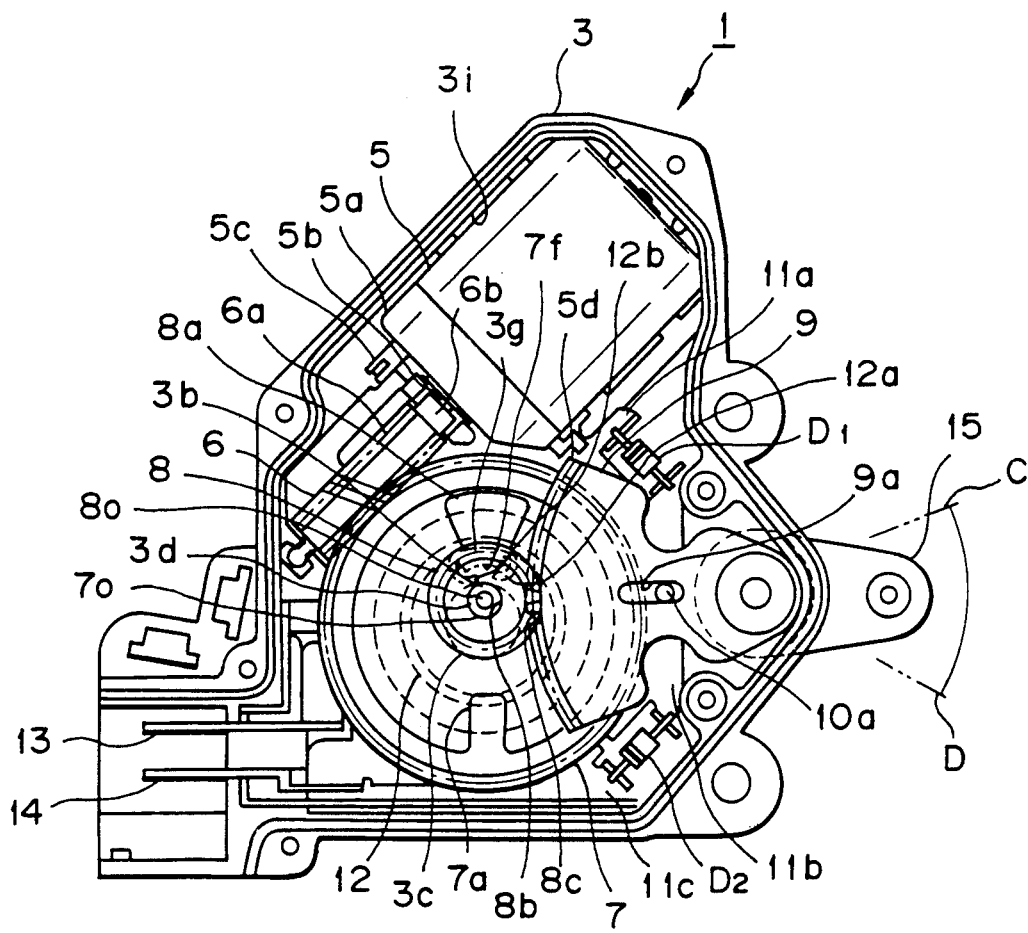
FIG. 1 is a top plan view of the actuator according to an embodiment of this invention with the upper casing removed.

An actuator 1 shown in FIGS. 1-7 comprises principally a casing 4 consisting of an upper casing 2 and a lower casing 3, a motor 5 having a shaft 5b protruding from an end cover 5a, a worm 6 fixed to said shaft 5b, a worm wheel 7 meshed with said worm 6 and provided with a pinion-engaged part 7a, a pinion 8 provided with a worm wheel-engaging part 8a engaged with said pinion-engaging part 7a and having an rotational axis 8o in a position different from the position of a rotational axis 7o of the worm wheel 7, a sector wheel 9 meshed with the pinion 8 and provided with a holder engaging slot 9a, a contact holder 10 linking to said sector wheel 9 through said holder-engaging slot 9a, and a positional switch 11 being a kind of rotary switch of which contacts 11a, 11b and 11c are switched on and off according to the linkage of the contact holder 10 with said sector wheel 9 as a changeover means in this embodiment.

Figure 2:
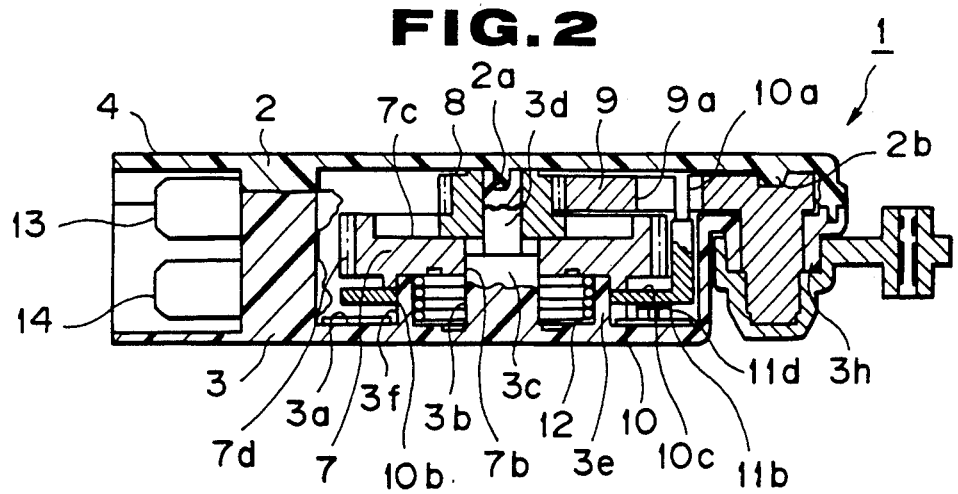
FIG. 2 is a vertical sectional side view of the actuator shown in FIG. 1 in the covered state with the upper casing.

The upper casing 2 and the lower casing 3 are assembled in a body as shown in FIG. 2 by putting the respective openings of the casings together.

The lower casing 3 is provided in the nearly center part of a bottom plate 3a with intermediate shaft 3b projecting upwardly in FIG. 2.

The intermediate shaft 3b is comprised of two shafts constricted as one body having central axes different from each other. The intermediate shaft 3b includes a worm wheel shaft 3c for supporting the worm wheel 7 rotatably around the rotational axis 7o of the worm wheel 7 on the side near to the bottom plate 3a and a pinion shaft 3d for supporting the pinion 8 rotatably around the rotational axis 8o of the pinion 8 located at the position shifted slightly in the upper direction in FIG. 1 from said rotational axis 7o of the worm wheel 7 on the upper side of said worm wheel shaft 3c in FIG. 2.

Figure 3:
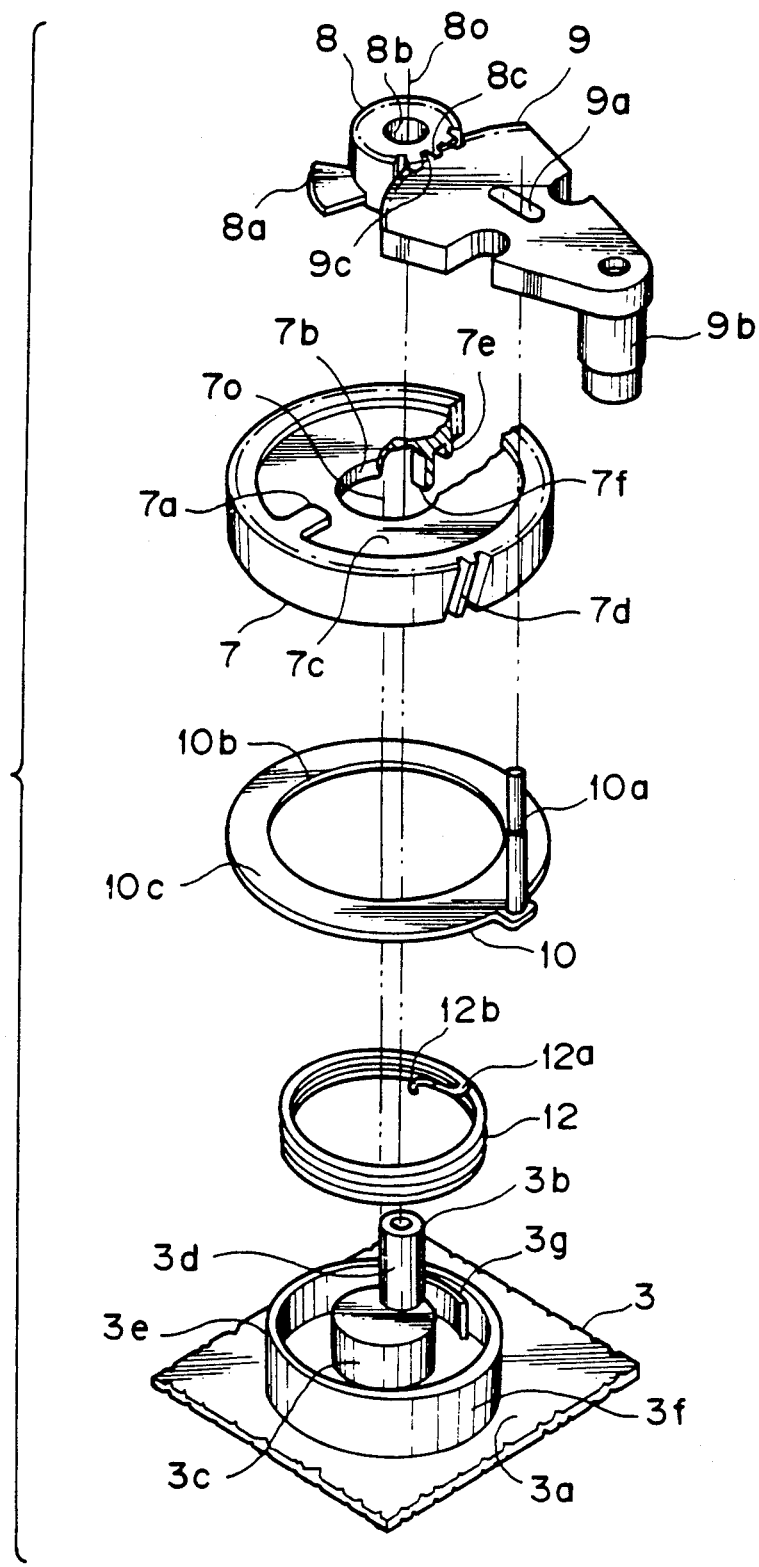
FIG. 3 is a perspective view of the respective parts showing assembling relations of the worm wheel, the pinion, the sector wheel and the contact holder of the actuator shown in FIG. 1.

The lower casing 3 is provided with an annular protrusion 3e protruding in the upward direction in FIG. 2 from the bottom plate 3a on the outer peripheral side of the intermediate shaft 3b, and furthermore, is provided with a holder support surface 3f for supporting the contact holder 10 rotatably to the outer periphery of said protrusion 3e and, with a spring engaging part 3g projecting upwardly from the bottom plate 3a in FIG. 3 in a part on the upper side of the intermediate shaft 3b in FIG. 1 and on the inner peripheral side of said protrusion 3e.

Additionally, the lower casing 3 is provided with a sector wheel bearing 3h piercing the lower casing 3 and for supporting the sector wheel 9 rotatably on the right side in FIG. 2 and, with a motor fitting part 3i on the upper side in FIG. 1 for inserting the motor 5 in a position in which the longitudial direction of the shaft 5b of the motor 5 intersects at right angles to the direction of the depth of the lower casing 3.

The upper casing 2 is provided with an intermediate shaft supporting part 2a for supporting the upper end of intermediate shaft 3b in FIG. 2 at the position corresponding to the intermediate shaft 3b provided to the lower casing 3, and with a sector wheel supporting part 2b for supporting the upper end of the sector wheel 9 in FIG. 2 at the position corresponding to the sector wheel bearing 3h on the right side in FIG. 2.

The motor 5 is provided with the shaft 5b protruding from the end cover 5a, and the shaft 5b may rotate in the forward and reverse direction by supplying a electric current changeably to motor terminals 5c and 5d provided to said end cover 5a.

The worm 6 is provided with a toothed part 6a and a shaft part 6b and the worm 6 is attached to the shaft 5b of the motor 5 at the shaft part 6b and may rotate in the forward and reverse directions with said shaft 5b.

On the one side, the worm wheel 7 is provided with a disk part 7c having a circular hole 7b with an inner diameter as large as possible to placed the worm wheel shaft 3c of the intermediate shaft 3b in the center thereof, and with a toothed part 7d for meshing with the worm 6 on the outer periphery of said disk part 7c.

The disk part 7c is provided with the pinion-engaging location 7a projecting upwardly in FIG. 3 in a part near to the outer perophery thereof, and with an annular projection 7e protruding downwardly in FIG. 3 from said disk part 7c, and is provided with a spring engaging part 7f protruding downwardly in FIG. 3 at a position opposed to the pinion-engaging part 7a with respect to the circular hole 7b on the inner peripheral side of said projection 7e.

Then, numeral 12 in the figures is a spring for energizing the worm wheel 7 in the direction to return to its original position. Hooks 12a and 12b provided on the respective ends of the spring 12 are engaged with the spring engaging part 3g provided on the lower casing 3 in a state in which said spring 12 is housed in the protrusion 3e provided on the lower casing 3, and the spring engaging part 7f provided to the worm wheel 7 is inserted between said hooks 12a and 12b.

The worm wheel 7 is supported by the worm wheel shaft 3c of the intermediate shaft 3b and so structured as to rotate against the spring 12 around the rotational axis 7o and return to the predetermined position by elasticity of the spring 12.

On the other side, the pinion 8 is provided with a through hole 8b passing through in the vertical direction in FIG. 3 and having the inner diameter as large as possible to place the pinion shaft 3d of the intermediate shaft 3b in the center part thereof, a toothed part 8c for meshing with the sector wheel 9, and the worm wheel-engaging part 8a protruding outwardly from the outer periphery of said toothed part 8c and for engaged with the pinion-engaged part 7a provided to the worm wheel 7.

The pinion 8 is so structured as to rotate around the rotational axis 8o located at the position shifted upward for the rotational axis 7o of the worm wheel 7 in FIG. 1, differing from said rotational axis 7o of the worm wheel 7 supported by the worm wheel shaft 3d of the intermediate shaft 3b.

The sector wheel 9 is provided with a sector wheel shaft 9b having an outer diameter adapted to be inserted into the sector wheel bearing 3h of the lower casing 3, a toothed part 9c on the part projected fanwise in the left-hand direction from the upper end of said sector wheel shaft 9b in FIG. 2, and a holder-engaging slot 9a passing through in the vertical direction in FIG. 3 and cut out lengthwise in the right and left direction in FIG. 1 in the middle position between said sector wheel shaft 9b and said toothed part 9c for engaging the contact holder 10.

The sector wheel 9 is supported by the sector wheel bearing 3h provided to on the lower casing 3 and the toothed part 9c is meshed with the toothed part 8c of the pinion 8, the sector wheel 9 may rotate reciprocatively between side walls of the lower casing 3.

Additionally, the contact holder 10 made up of a ring shaped plate, is provided with a ring part 10c having a supporting part 10b with an inner diameter as large as necessary to pass the holder surface 3f of annular protrusion 3e provided to the lower casing 3 through and a fitting shaft 10a protruding upward in FIG. 2 from a portion of the outer side of said ring part 10c and for fitting into the holder-engaging slot 9a of the sector wheel 9.

Said contact holder 10 is supported by the holder support surface 3f provided on the lower casing 3, and is displaceable between position A and position B (see FIG. 4(a) to FIG. (7a)) by interlinking to said sector wheel 9 in a state in which the fitting shaft 10a provided to said contact holder 10 is fitted into the holder-engaging slot 9a provided to the sector wheel 9.

The positional switch 11, which is a kind of rotary switch and used as the changeover means in this embodiment comprises fixed contacts 11a, 11b and 11c installed and slightly spaced from each other on the upper side of the bottom plate 3a of the lower casing 3a in FIG. 2, and a movable contact 11d attached on the under side of the ring part 10c of the contact holder 10 in FIG. 2 and for contacting the fixed contact 11a with the fixed contact 11b and the fixed contact 11b with fixed contact 11c among the fixed contacts 11a, 11b and 11c corresponding to the displacement of the contact holder 10.

Hereupon, a diode $D_1$ is connected electrically with the fixed contacts 11a and 11b and a diode $D_2$ is connected electrically with the fixed contacts 11b and 11c.

The fixed contact 11a is connected to the motor terminal 5d provided on the motor 5, the motor terminal 5c of the motor 5 is connected to a connector terminal 13 and the fixed contact 11c is connected to another connector terminal 14.

Furthermore, numeral 15 in the figure is a swing arm or output arm for connecting with, for example, a lock rod (not shown) of a door, is fixed to the sector wheel shaft 9b of the sector wheel 9 on the outside of the lower casing 3, and is constructed so as to work between position C and position D corresponding to the movable range of the sector wheel 9.

Figure 4:
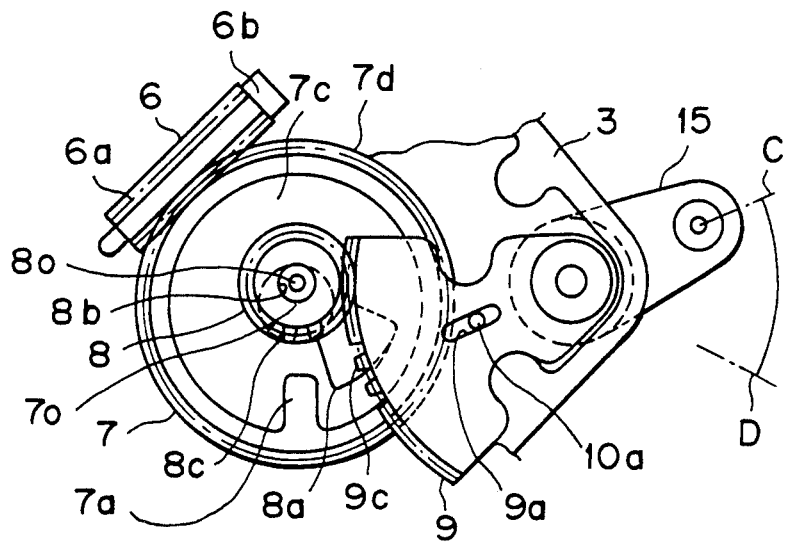
FIG. 4(a), FIG. 5(a), FIG. 6(a) and FIG. 7(a) are segmentary views illustrating the working states of the worm, the worm wheel and the pinion in the actuator shown in FIG. 1.
FIG. 4(b), FIG. 5(b), FIG. 6(b) and FIG. 7(b) are segmentary views illustrating the working states of the worm, the worm wheel and the casing in the actuator shown in FIG. 1.
FIG. 4(c), FIG. 5(c), FIG. 6(c) and FIG. 7(c) are segmentary views illustrating the working states of the contact holder and the positional switch in the actuator shown in FIG. 1.
Figure 4:
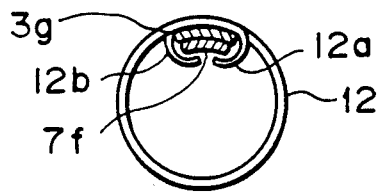
Figure 4:
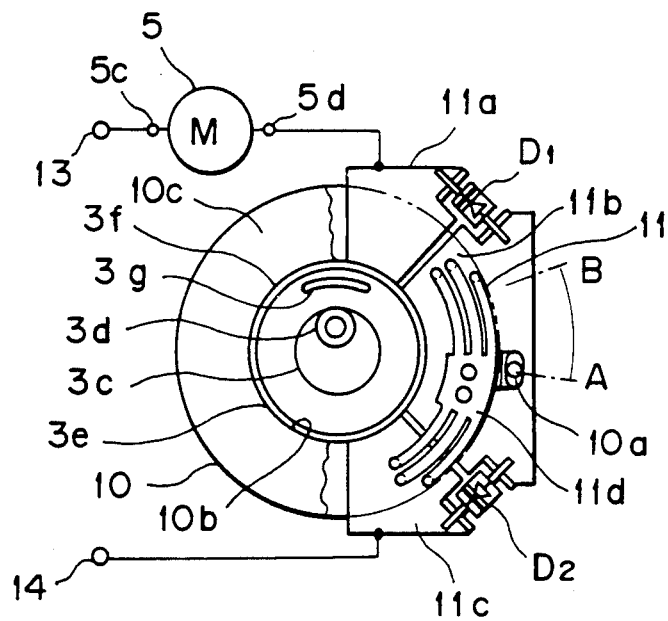

Then, the motor 5 is fitted into the motor fitting part 3i provided in the lower casing 3, the worm 6 is attached to the shaft 5b of said motor 5, said worm 6 is meshed with the worm wheel 7, and said worm wheel 7 is in a neutral state when the pinion-engaging part 7a provided on the worm wheel 7 is in the lowest position as shown in FIG. 4 (a), thereupon the spring engaging part 7f provided on the worm wheel 7 is in a position coinciding with the position of the spring engaging part 3g provided on the lower casing 3, at the uppermost position.

The pinion 8 is meshed with the sector wheel 9, the worm wheel-engaging part 8a provided on the pinion 8 is located on the right side of the pinion engaging part 7a provided on the worm wheel 7 as shown in FIG. 4(a) when the swing arm 15 is in position C, that is in a position in which the door lock is locked off.

Furthermore, the fitting shaft 10a provided to the contact holder 10 is fitted into the holder-engaging slot 9a provided in the sector wheel 9. The fitting shaft 10a of the contact holder 10 is in position A and the movable contact 11d is in a contacted state with the fixed contacts 11c and 11b when the swing arm 15 fixed to the sector wheel 9 is in position C, that is in a position in which the door lock is locked off as shown in FIG. 4(a).

Next, the working of the actuator 1 according to this invention will be described below.

In the first place, supplying an electric current through the connector terminal 14 in the state shown in FIGS. 4(a), 4(b) and 4(c), that is in the state in which the door lock is locked off, the electrical current flows to the connector terminal 13 from the fixed contact 11c through the movable contact 11d, the fixed contact 11b, the diode $D_1$, the motor terminal 5d, the motor 5, and the motor terminal 5c, and the motor 5 rotates in the forward direction.

By the rotation of the motor 5, the worm wheel 7 meshed with the worm 6 rotates in the anticlockwise direction in FIG. 4(a), the pinion 8 also rotates in the same direction with that of the worm wheel 7, that is in the anticlockwise direction in FIG. 4(a) after the pinion-engaging part 7a provided on the worm wheel 7 is engaged with the worm wheel-engaging part 8a provided on the pinion 8.

Hereupon, the torque transmitted to the pinion 8 by the worm wheel 7 reaches the maximum when the pinion-engaging part 7a provided on the worm wheel 7 is near to the lowest position in FIG. 4(a) because the rotational axis 8o of the pinion 8 is shifted upwardly in FIG. 4(a) from the rotational axis 7o of the worm wheel 7. The sector wheel 9 and the swing arm 15 fixed to the sector wheel 9 are set so as to be sited at their starting position when the worm wheel 7 and the pinion 8 are in the above-mentioned state as shown in FIG. 4a. Accordingly, the swing arm 15 is so designed as to generate maximum driving force at its starting time when the largest force is required for actuating the door lock system.

By the rotation of the pinion 8, the sector wheel 9 meshed with said pinion 8 rotates, thereby the swing arm 15 fixed to said sector wheel 9 works in the clockwise direction in FIG. 4(a) and the contact holder 10 is displaced in the anticlockwise direction in FIG. 4(c).

Figure 5A:
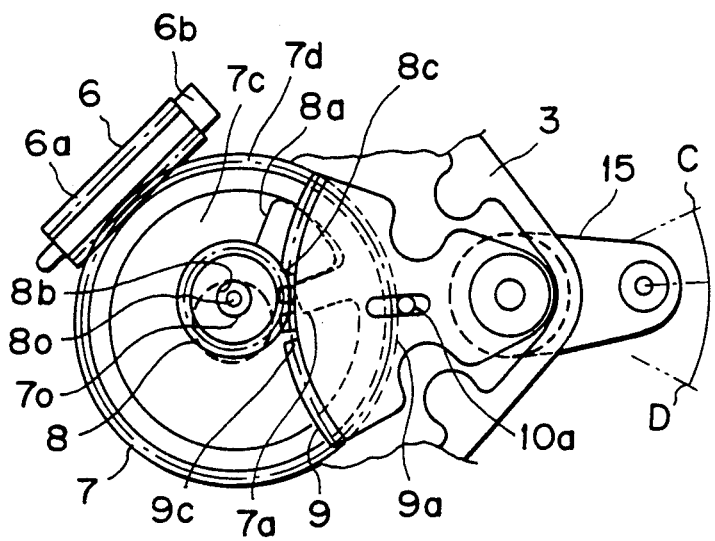
Figure 5B:
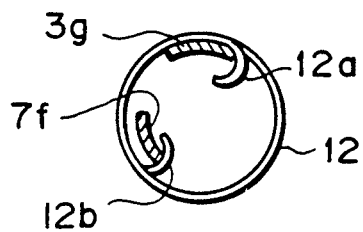
Figure 5C:
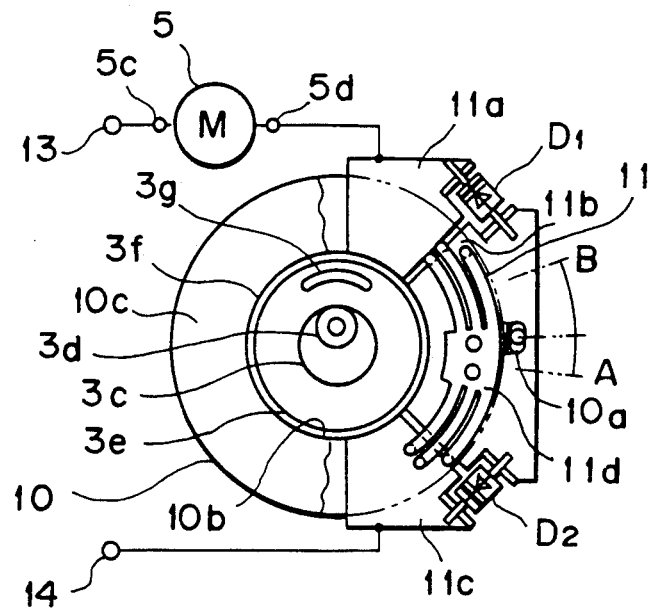

Next, when the worm wheel 7 rotates as the pinion-engaging part 7a provided on the worm wheel 7 is engaged with the worm wheel-engaging part 8a provided on the pinion 8 as shown in FIGS. 5(a), 5(b) and 5(c), the spring engaging part 7f provided to the worm wheel 7 moves against the spring 12 in the anticlockwise direction as shown in FIG. 4(b).

Figure 6A:
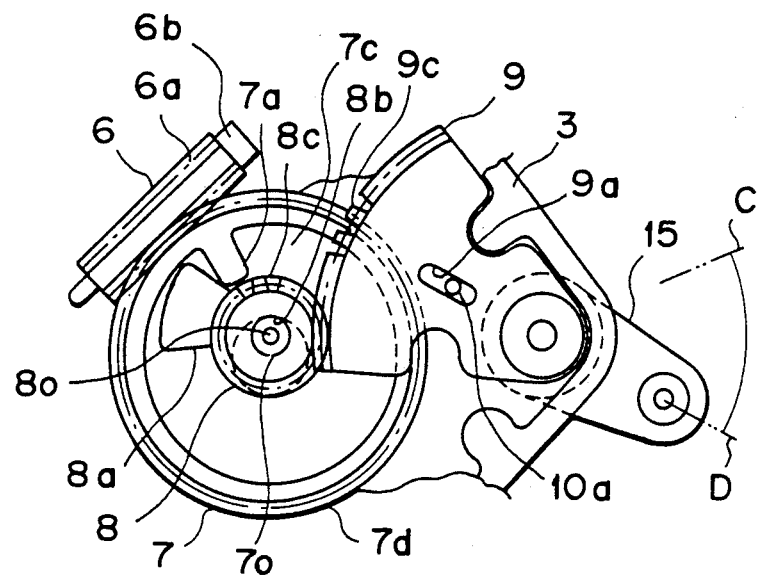
Figure 6B:
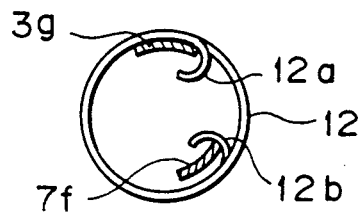
Figure 6C:
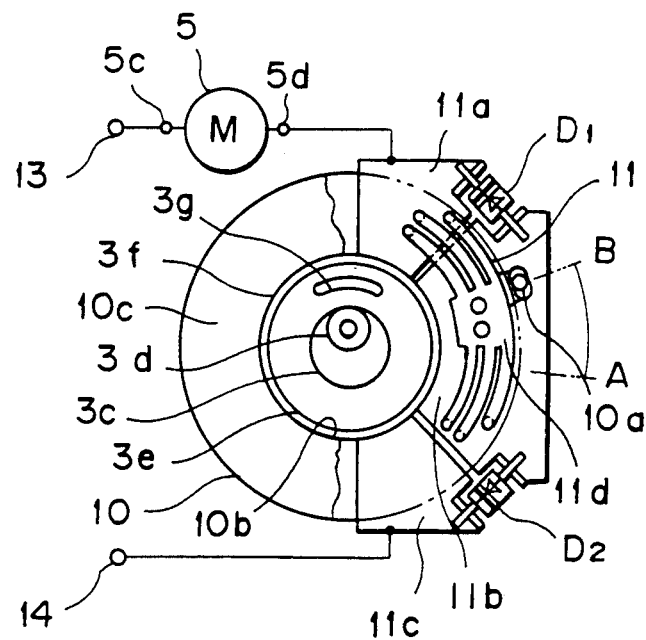

Subsequently, the movable contact 11d separates from the fixed contact 11c and makes the fixed contacts 11b and 11a into the contacting state at the same time the sector wheel 9 moves rotatably and the contact holder 10 displaced linking to said sector wheel 9 arrives at position B as shown in FIG. 6(a), 6(b) and 6(c).

Thereby, the circuit of an electric current supplied through the connector terminal 14 to the motor 5 is opened and the motor 5 stops. The swing arm 15 fixed to the sector wheel 9 arrives at position D from position C and makes the door lock (not shown) into its lock-on state.

Figure 7A:
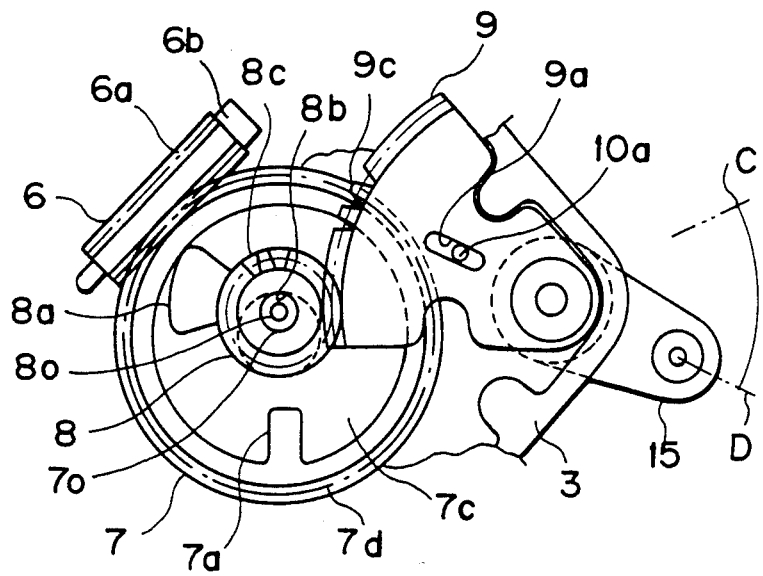

After the swing arm 15 arrives at position D and makes the door lock into the lock-on state shown in FIG. 6(a), 6(b) and 6(c), the worm wheel 7 rotates solely in the clock-wise direction and becomes into the neutral state that is the state in which the pinion-engaging part 7a is in the lowest position as shown in FIG. 7(a), because the spring engaging part 7f provided to the worm wheel 7 is energized by the spring 12 in the direction to return, that is in the clockwise direction from the state shown in FIG. 6(b).

At this time, the worm 6 rotates by the rotation of the worm wheel 7 and the shaft 5b provided to the motor 5 also rotates.

Figure 7B:
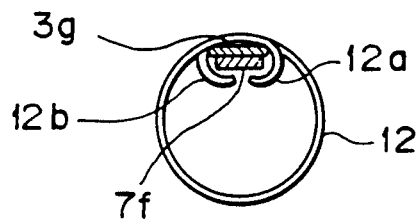
Figure 7C:
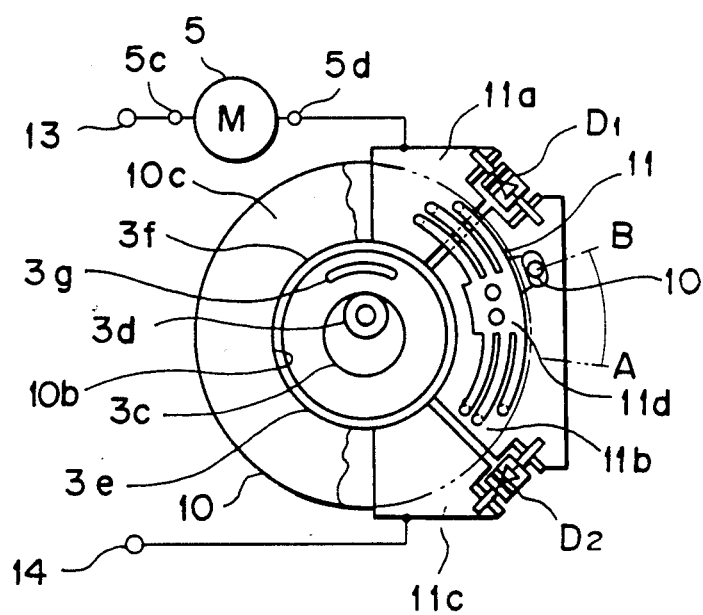
Figure 8:
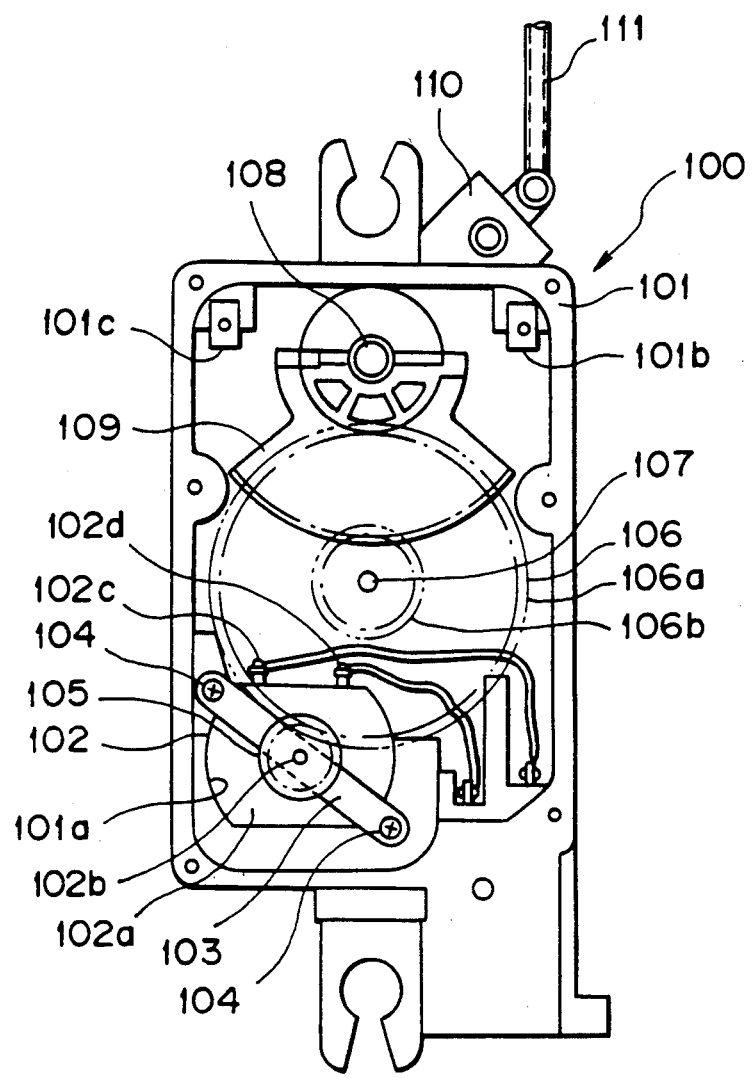
FIG. 8 is a top plan view of the conventional actuator.

Furthermore, in the state shown in FIG. 7(a), 7(b) and 7(c), supplying an electric current through the connector terminal 13, the electric current flows to the connector terminal 14 from the motor terminal 5c through the motor 5, the motor terminal 5d, the fixed contact 11a, the movable contact 11d, the fixed contact 11c, and the diode D₂, and so the motor 5 rotates in the reverse direction. Thereby the worm wheel 7 rotates in the direction in contrast with the aforementioned explanation, the swing arm 15 moves to position C from position D and is restored to the state as shown in FIG. 4(a), 4(b) and 4(c).

As mentioned above, the actuator according to this invention comprises a motor, a worm provided on a shaft of said motor, a worm wheel meshing with said worm, provided with a pinion-engaging part and energized in the direction to return to the original position, a pinion provided with a worm wheel-engaging part to be engaged with said pinion-engaging part and having a rotational axis in a position different from the position of a rotational axis of said worm wheel, a sector wheel secured to an output arm meshing with said pinion and provided with a holder-engaging slot, a contact holder linking to said sector wheel through said holder-engaging slot, and a changeover means for switching contacts on and off according to the linkage of said contact holder with said sector wheel. Therefore, an excellent effect can be obtained since it is possible to make the actuator more compact as compared with the conventional type.

What is claimed is:

1. An actuator comprising:
   a motor having a shaft;
   a worm connected to said shaft of said motor;
   a worm wheel disposed in meshing engagement with said worm and provided with a pinion-engaging part and spring means for biasing the worm wheel to an original starting position;
   a pinion provided with a worm wheel-engaging part to be engaged with said pinion-engaging part and having a rotational axis offset from a rotational axis of said worm wheel;
   a sector wheel having an output arm and a holder engaging slot, said sector wheel being disposed in meshing engagement with said pinion;
   a contact holder linked to said sector wheel by means of a projection extending through said holder-engaging slot; and
   a changeover means for switching contacts on and off according to the position of said contact holder with respect to said sector wheel;
   said sector wheel being located at a starting position when said pinion-engaging part is engaged with said worm wheel-engaging part at a position opposite to the rotational axis of said pinion relative to the rotational axis of said worm wheel.

* * * * *